Nov. 9, 1965 R. A. COLE 3,216,526
LADDERS
Filed Dec. 17, 1962 6 Sheets-Sheet 1
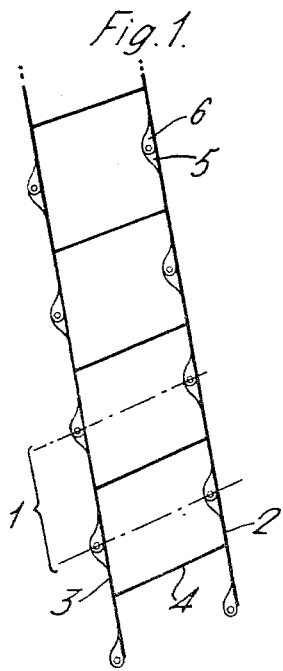
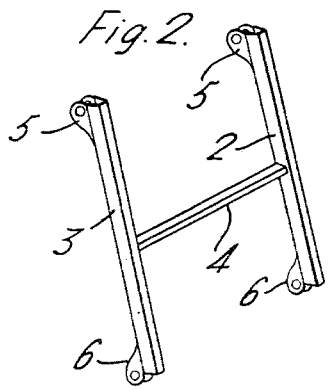
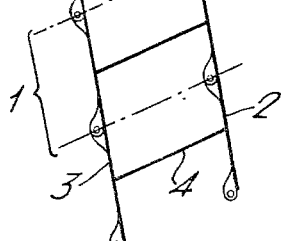
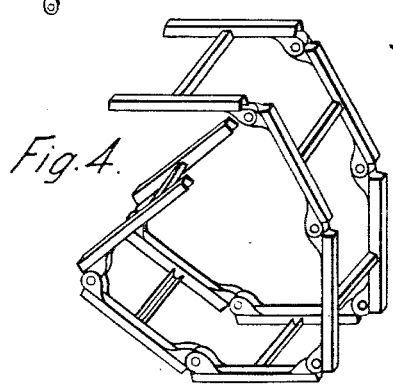
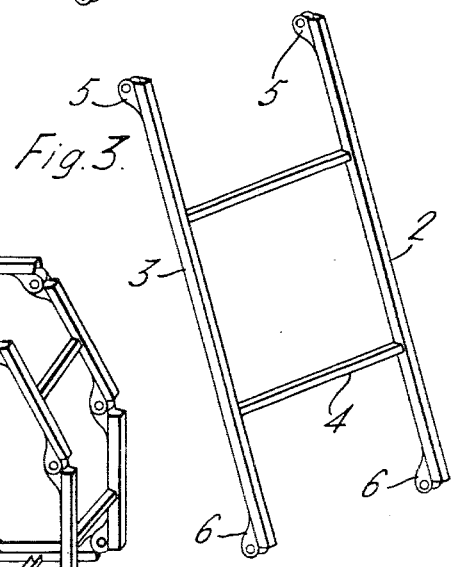
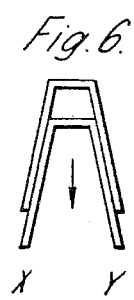

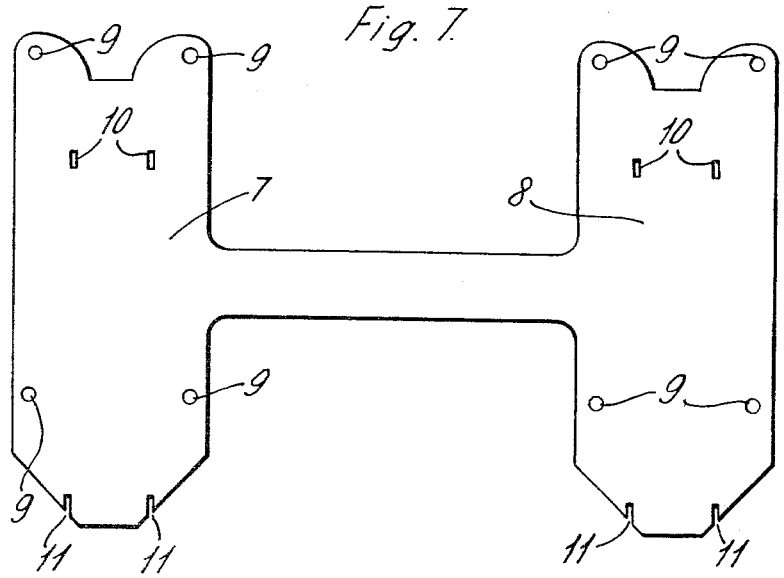
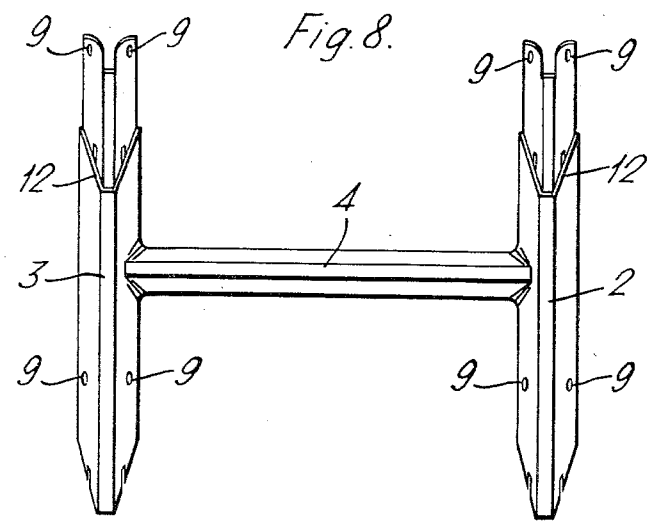

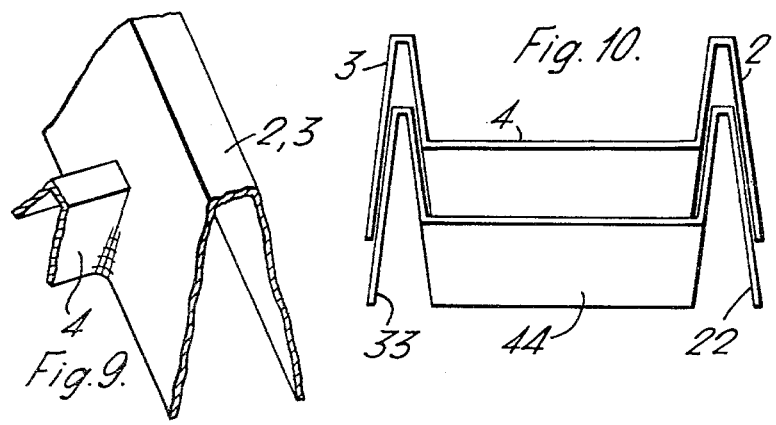
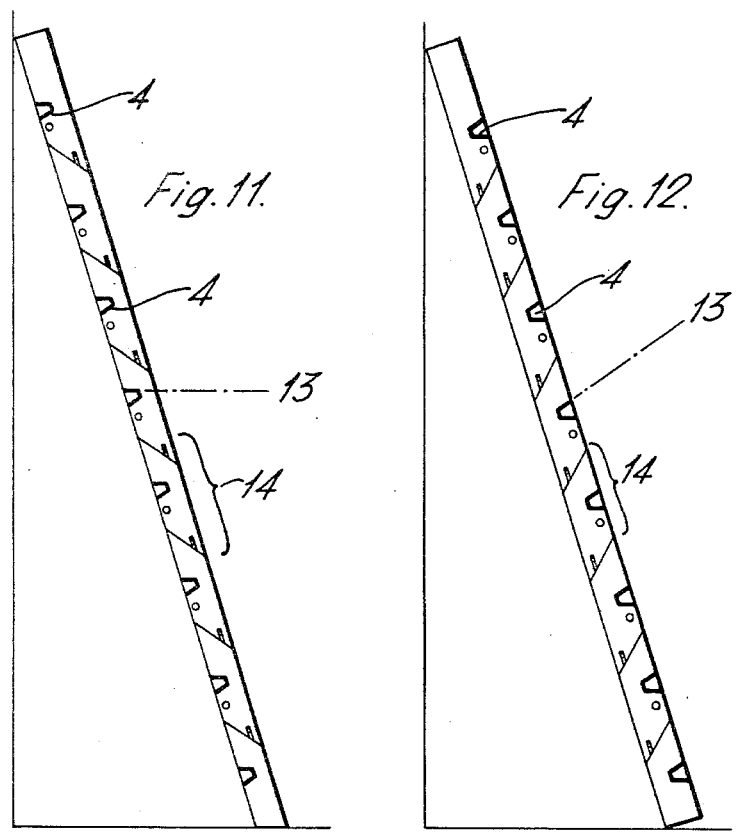

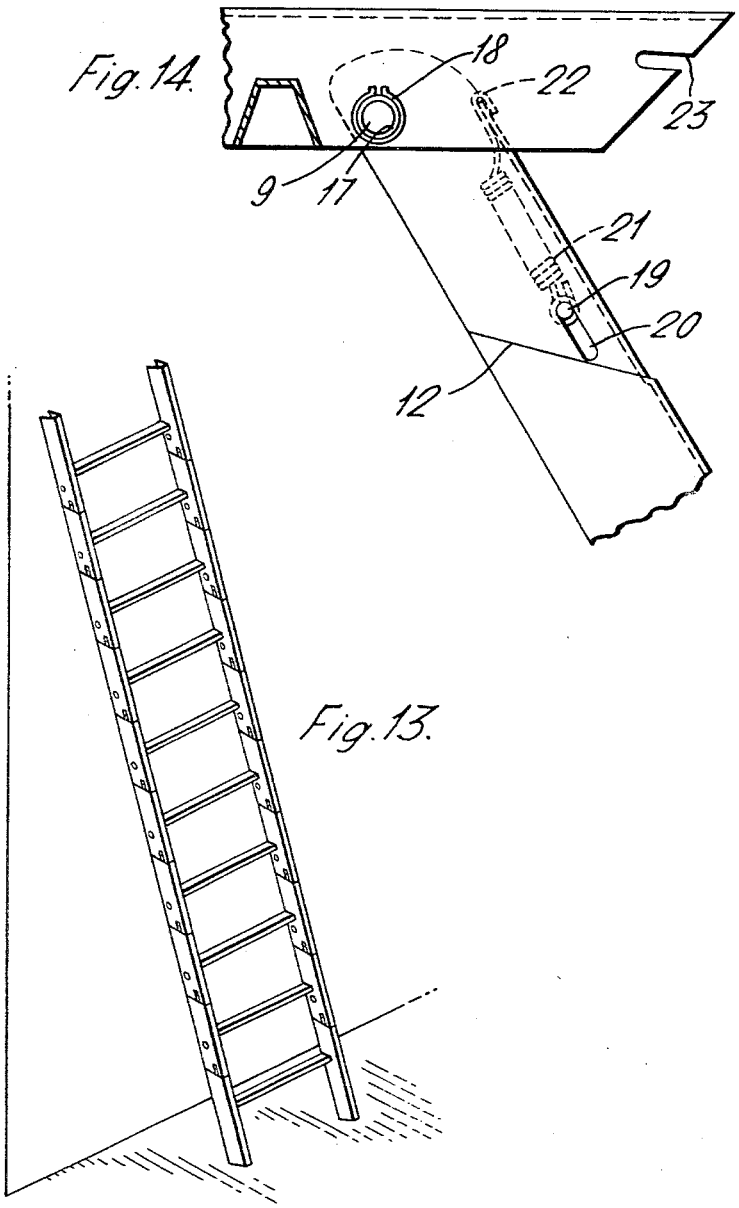

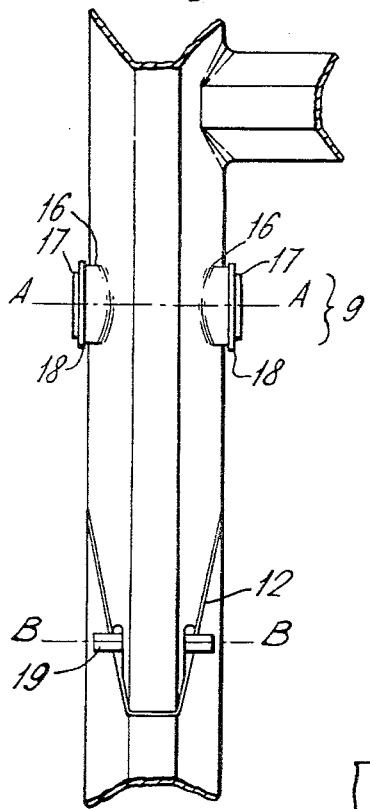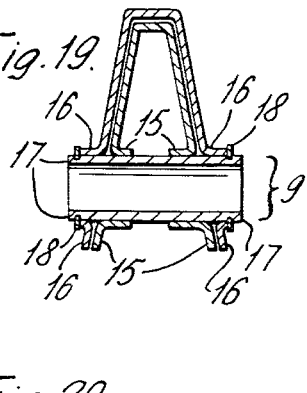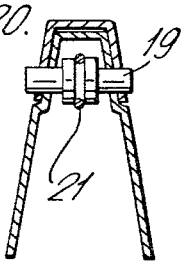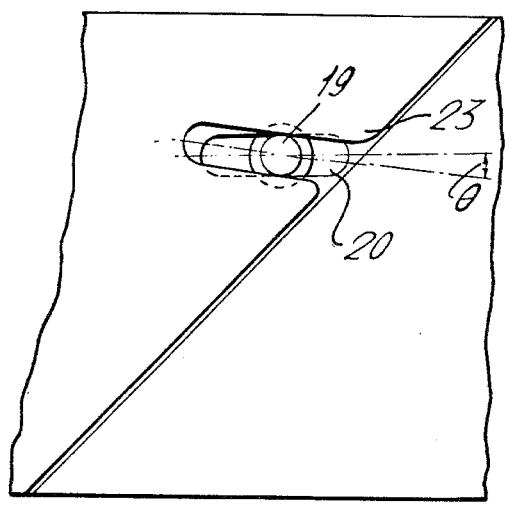

United States Patent Office 3,216,526
Patented Nov. 9, 1965

3,216,526
LADDERS
Rudolf Arthur Cole, London, England, assignor to Racole Trading & Manufacturing Company Limited, London, England
Filed Dec. 17, 1962, Ser. No. 245,013
Claims priority, application Great Britain, Dec. 18, 1961, 45,346/61
2 Claims. (Cl. 182—163)

This invention relates to folding and convertible ladders and accessories for ladders.

Folding ladders are known in which the rung forms the pivot of the hinge and where the locking device is situated within the vicinity of the combined rung/hinge assembly. There are, however, two principal disadvantages in utilising the rungs as hinge pivots. Firstly, when a ladder consisting of several sections is in use, the hinge pins are subjected to compression; however, when a person puts his weight on a particular rung, an additional twisting load/motion is developed on the hinge pin ends of the rung. The hinge pin/rung must, therefore, be adapted not only to withstand the normal compression loading, but also the twisting motion when an individual rung is used. To withstand these additional twisting forces the construction must be unnecessarily robust if the ladder is to withstand constant use. Secondly, in utilising the rung as pivot of the hinge assembly the hinge area does not allow for the mounting of a lock of adequate dimensions to give full security, particularly when the ladder is inadvertently used back to front, that is to say, with the lock in tension against the hinge pivot and lugs. Another disadvantage of folding ladders in which the rung is the pivot of the hinge assembly, is that the rung must be round; the ladder can therefore be used back to front, as the user has no ready means of distinguishing which is the correct side of the ladder.

The present invention has among its objects to obviate these disadvantages. A further object is to provide accessories and components as well as methods of manufacturing ladders which will not only provide a more versatile ladder, but will also improve the properties of a wide range of known ladders.

According to the invention, a collapsible and convertible ladder includes a plurality of sectional elements, each element comprising two stile members and at least one rung disposed substantially in the form of an H. The stile members of each section are joined to the stile members of the adjacent section by hinges, and the hinges of a number of sections so secured together, that they can be folded in the same plane. A locking device is fitted within the hinge area to retain the sections in position when the lock is closed, so that when all the locks of a multi-sectional ladder are closed, a rigid, staright ladder is provided. When the locks are opened the sections can be folded over each other, each section pivoting when the sections of the ladder are folded when not in use. Of all sections in one plane, the ladder with locks open, can be rolled up; when all locks are closed (when the ladder is rigid) the load is applied from the side furthest away from the pivot of the hinge, so that the end of the stiles of each section abutting the adjoining section are under compression and the firmness of engagement of the sections is enhanced. It will be noted that according to the invention, the rung forms part of the structural members of the ladder and is not the hinge pin of the hinge assembly.

According to the invention furthermore a ladder comprises a plurality of hinged elements of channeled section to enable the sections to fit the one with the other when sections of the ladder are folded when not in use. The distance between the two arms of the channel, at their widest, should be kept at the minimum, as with the widening spread of the two arms, the resistance to bending of the stile member would decrease. The construction according to the invention simplifies the process of manufacture and cuts down the cost of production, for the reason that sections of the ladder and the rungs can be pressed out of sheet metal or plastic simultaneously, into a channeled section. By forming the rungs with this channeled section, the arms of the section would be at such an angle that when the ladder is placed against a wall at the correct slope, the upper arm of the section of the rung would be in a horizontal position. Thus the rung would not only prevent the user from inadvertently using the ladder back to front (for he would then stand on an uncomfortable knife-edge) but it would also be less fatiguing to the user than a conventional round rung, when in use in the correct position. Pressing the rung in the same operation as to the two stile members avoids any welding, soldering or mechanical assembly. Advantageously the rung should be of a smaller cross-section than the stiles, as unless this were so the advantage of stacking the stile members would be lost. The provision of channel section stile members makes it possible to form the hinges as an integral part of stile members in the same operation as the stiles or as the stiles and the rungs are formed. It is then merely necessary to connect the male and female part of the hinge of two adjoining ladder sections with a pin or sleeve acting as pivotal axis. Joining of the ladder sections thereby becomes the single assembly operation of fixing the pivot pin, and again avoids any welding, brazing or mechanical fixing of the hinge member; this also makes it possible to add, at a later date, extensions to the ladder by simply adding further sections. It is a further object of this invention to fit a locking device which will hold the afore-said assembled ladder sections together in a positive manner, in order to give the ladder, when extended, complete rigidity. The locking device must be strong enough to bear a load when the ladder is used back to front and the lock is under tension (although the preferred shape of channeled rung will make such use unlikely). Furthermore the locking device must be self-tensioning so that in case of wear on the hinge the ladder sections are pulled together by the locking device; the lock must also be readily replaceable in case of accidental damage. According to the invention one construction of locking device comprises a slot provided near and parallel to the apex of the end of the stile section, which has been reduced to act as male member of the hinge. A complementary shaped U slot is provided in the same position at the end of the adjoining stile section which forms the female member of the hinge. A sliding pin is fitted through the slot of the male member hinge section and extends outwardly to engage into the open U slot of the female member. A spring is provided to pull the pin in the direction of the open U slot. When closing the ladder lock, the arms of the adjoining stile member will push the sliding pin forward until it snaps back into the open U section, thereby firmly retaining the two sections in a locked position. The lock therefore acts as if it were bolting two ladder sections together.

A ladder according to the invention can be constructed by adapting any known construction of ladder accordingly. If the construction is desired to be basically that of a conventional wooden ladder, the hinge assembly can readily be sleeved over the stile members. In this case a suitable locking device would be the above-described lock with the hinge forming part of the casing sleeve, the complete lock hinging assembly being sleeved over the end of the stiles of the individual adjoining ladder sections.

The invention is diagrammatically illustrated by way of examples in the accompanying drawings, in which:

FIGURE 1 is a perspective view of a ladder consisting of sections joined together and fully extended.

FIGURE 2 is a perspective view of an individual H section with male and female hinge members on opposite ends respectively of the stiles.

FIGURE 3 is a perspective view of a double H section having two rungs within the stile members with male and female hinge member on opposite ends respectively of the stiles.

FIGURE 4 is a perspective view of a ladder partially rolled up, showing H sections with hinges joined together, all hinges being in one plane.

FIGURE 5a, b and c are perspective views of cross sections of stile sections.

FIGURE 6 is an end sectional view of two sections stacked the one upon the other.

FIGURE 7 is the plan view of a blank of metal or plastic, having the shape of an H in plan, adapted to be pressed to form a hollow construction and showing holes adapted to receive the pivotal axis and the locking pin.

FIGURE 8 is the plan view of the blank illustrated in FIGURE 7, after pressing into a channel section.

FIGURE 9 is a perspective view showing a joint of rung and stile formed in the same operation, with the rung being of smaller dimensions than the stile.

FIGURE 10 is a cross section of a stile with the rung attached, showing the depth of stacking which is possible.

FIGURE 11 is a side sectional elevation of a ladder resting against a wall at the correct angle, with the position of the rungs substantially horizontal as indicated by the dotted lines.

FIGURE 12 is a side sectional elevation of the ladder resting against a wall at the correct angle, but the ladder being used back to front.

FIGURE 13 is a perspective view of a multi-sectioned collapsible ladder according to the invention.

FIGURE 14 is a side view of two ladder sections with their respective stiles secured together with the pivotal axle pin, in the folded position with the joint in the open position.

Figure 15:
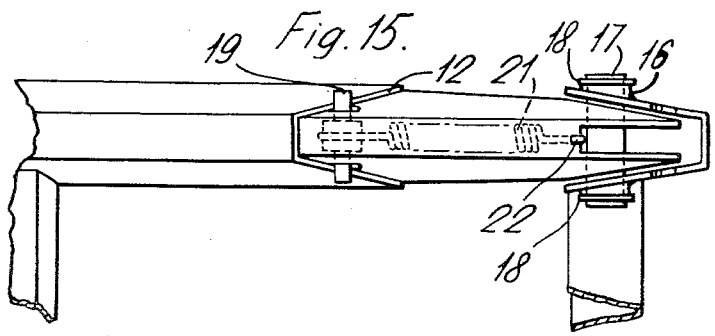

FIGURE 15 shows a plan view of the construction illustrated in FIGURE 14.

Figure 16:
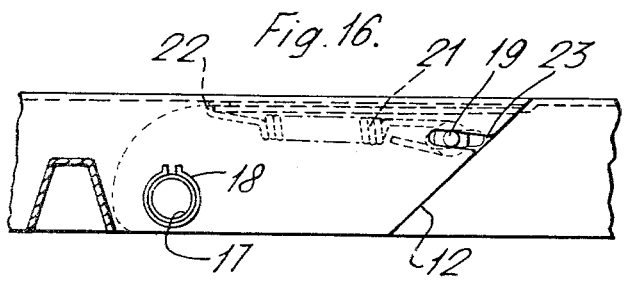

FIGURE 16 is a side view of two stile sections, locked in position (lock type A).

Figure 17:
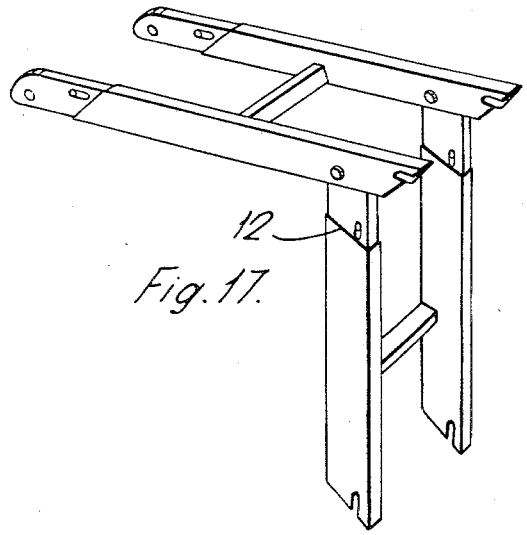

FIGURE 17 is a perspective view of two ladder sections when opened.

FIGURE 18 is a plan view of the construction illustrated in FIGURE 16.

FIGURE 19 is a cross section on the line A—A of FIGURE 18.

FIGURE 20 is a cross section on the line B—B of FIGURE 18.

FIGURE 21 is an enlarged side elevation of the lock "Type A" illustrated in FIGURES 14, 15, 16, 18 and 20.

In the drawings, FIGURES 1 and 2 illustrate a ladder having a plurality of sections, joined together as a collapsible and convertible ladder by hinges 5, formed on or secured to the ends of the stile members 1. All hinges are mounted in the same plane so that when the ladder is in use the abutting ends of the stiles of each section are under compression and tightening/closing is enhanced. One ladder section 1 consists of two stile members 2 and 3, one rung 4, one female hinge member 5 on each stile and one male hinge member 6 on the other end of each stile.

FIGURE 3 illustrates an enlarged ladder section, containing two rungs per ladder section and this construction of large ladder section of two, three or even more rungs is envisaged for very long ladders, where the folding up is of particular advantage, but where the overall volume of the folded up unit allows for an initially larger section. While the invention is not limited to the number of sections, it is neither limited by the number of stiles in any one section.

FIGURE 4 illustrates a ladder made up of ladder sections as illustrated in FIGURE 2, partially rolled up, showing clearly the advantageous effect of having the hinges of the various sections all disposed in one plane.

The stiles may be channeled as illustrated in FIGURES 5a, b and c. FIGURES 5a and c show stiles which may be stacked the one over the other. Such channeled sections may be constructed by pressing or moulding sheet metal or plastic. The section illustrated in FIGURE 5b does not, however, allow for stacking, but may be used for a converging ladder where the ladder is wider at the base than at the apex.

FIGURE 6 is a cross section of the two sections of the channel section illustrated in FIGURE 5a, the one stacked into the other. As the ladder is used with the narrow closed end facing the user and the open side being on the reverse and as, therefore, the maximum load is in the direction of the arrow shown in FIGURE 6, it is essential that the distance of the arms of the channel section marked $x$ and $y$ are of sufficient dimensions to allow stacking of two elements as shown in FIGURE 6.

In FIGURE 7, a blank in the shape of an H is stamped out of a metal such as steel or light alloy or out of plastic or out of resin pre-impregnated glass fabric/mat. The uprights of the H 7 and 8 of the section are formed in such a manner as to utilize the ends of the upright as male and female members of the hinge when suitably pressed. In the same pressing, holes 9 are punched which are adapted to receive the pivot sleeve which will join the ladder sections together. In order to utilize the securing devices of the ladder supports, the inner diameter of the sleeve should be at least ½″, so that the dimensions of the holes 9, allow for the wall thickness of the sleeve. Slots 10 and open slots 11, are also provided in the same operation. The slots 10 are adapted to retain the locking pin, and the open slots 11 will be used to engage in the pin inserted through the slot 10. The blank illustrated in FIGURE 7 provides for all the necessary hinging and anchorage points, without the need for any additional welding, soldering, riveting or the like. The punch holes can be modified to receive different hinge pins and to take any of the other locking devices hereinbefore described. In FIGURE 8, the ladder section has been pressed into its final shape out of the blank illustrated in FIGURE 7, whereby the stile members 2 and 3 and rung member 4 are in the shape of a channeled section. The holes 9 are adapted to receive the connecting pin or sleeve which will join one section to the other. It will be noted that an offset portion 12, is provided to reduce the stile member during pressing, so that the end of the stile member may act as male member of the hinge; this particular method has the advantage that the overlap of the adjoining ladder section will reinforce and steady the joint. While for the development of the invention the shape has been obtained by way of a pressed or moulded blank, it is equally applicable to obtain it by drop forging, casting or laminating, whether in metal, plastics or wood or combination of these materials with each other or with alternate reinforcements such as, for example, glass fibre.

FIGURE 9 is a perspective view of that part of the ladder section where a rung is connected to a stile. This view shows the dimensional reduction of the rung section 4 compared to the stile section 2 or 3. It is proposed that ribs be provided running longitudinally to the rung to provide a non-slip surface; similarly ribs can be incorporated in the stile pressing running longitudinally, thus acting as a reinforcement.

FIGURE 10 is a cross section through two stile sections 2 and 3, with their respective rung sections 4 stacked over another section.

FIGURES 11 and 12 show a side sectional view of an assembled multi-sectional ladder, consisting of eight ladder sections 14, built up from the sections illustrated in FIGURE 8. In FIGURE 11, the ladder is shown placed against a wall in its correct position. The upper surface of the arms of rungs 4, on which the user has to stand when using the ladder, are horizontal as indicated by the broken line 13. In FIGURE 12, the same ladder is shown placed against a wall back to front. It will be seen that the line 13 is at an angle to the horizontal, thus making it difficult for the user to stand on the rungs.

A ladder comprising the details of construction illustrated in FIGURES 14 to 21 inclusive, is shown in FIGURE 13. Ladder sections obtained from a blanked sheet (see FIGURE 7) and pressed to the desired channeled shape (see FIGURES 5a and 8) are assembled as shown in FIGURES 14, 15, 16, 17, 18, 19 and 20. The construction illustrated in FIGURE 13 is made up of ten ladder sections. Any desired number of sections may however be employed. In the process of pressing the blank into the sections shown in FIGURE 8, a reduced male section in the hinge is pressed out at the line 12 (see FIGURE 8). In FIGURE 15, the offset line 12 which starts the reduction of the end of the section to form the hinge, may be seen. The offset line 12 is also shown in FIGURES 14, 16, 17 and 18.

The male end of the stile section may further be improved by forming the holes 9 with collars 15 (see FIGURE 19, showing a cross section on the line A—A of FIGURE 18). On the female section of the ladder, the holes 9 are provided with collars 16, as can be seen in FIGURES 15, 18 and 19.

The male and female hinge member of two adjoining sections are joined together by a pin or preferably a hollow tube 17, which is turned over at one end and provided with a circlip or similar fixing device on the other end or with a bolt or tube secured with two circlips 18, as shown in FIGURES 14, 15, 16, 18 and in the cross section illustrated in FIGURE 19.

FIGURE 19 shows the reduced portion of the male member fitting correctly inside the female member, where the two hinge sections male and female, are joined together by the tubular member 17. The line of commencement of reduction 12, on the female member, should be as well defined as possible, so that the male member, when the ladder is fully extended (that is to say when the hinge is closed), will fit flush against the edge of the female member of the stiles of the adjoining ladder section.

The locking device is illustrated in FIGURES 14, 15, 16, 18 and 20 and 21. Thus a pin 19 is inserted through the slot 20, the slot having already been provided in the stamping operation and referred to by the numeral 10 in FIGURE 7. The pin is kept under tension in the direction of the adjacent male hinge by means of a spring 21, which is hooked over or otherwise secured to the pin 19 on one end, and around the upper end of the male member at 22 at the other end. The lock, which is self-closing, operates by the female member pushing the pin forward until it reaches the open U slot 23, where it engages under tension.

According to the invention, the slots of the male and female members are disposed at a slight angle θ (FIGURE 21) in relation to each other, so that the locking pin 19, which is under tension by the spring 21 (FIGURE 15), firmly wedges the male and female members of the hinge section together. FIGURE 21 has been drawn as an enlarged view in order to show the angles between the respective slots. The slot of the male member may conveniently be modified with a safety recess, so that in case of spring failure, the pin gets caught in such a recess and prevents accidental opening of the lock.

To open the lock, the protruding pin 19 is pulled backwards, to allow the open slot of the female member to be freed.

The safety and strength of the ladder is further increased by the length of over-lap of the male and female members. This safety and strength is further increased by the distance of the locking device from the point of pivoting. The position of the pivot in relation to the locking mechanism, is solely governed by the loading factor and can be reduced or repositioned as desired. Similarly, the position of the rung between the stile members can be moved so that the ladder section may have the shape of a U, instead of an H, without the rung being the pivot of the hinge assembly.

I claim:

1. A collapsible ladder comprising in combination: a plurality of sections; each of said sections including two longitudinal stringers; at least one rung interconnecting each pair of stringers; said rung being disposed between said stringers at a position intermediate the ends of said stringers; said rung being formed with a substantially flat upper surface at such an angle that when the ladder is in its extended position of use at an angle, as when set in the position of use against a vertical wall, the upper surface of the rung is substantially parallel to the ground; pivot means connecting said sections together; said pivot means comprising a male member, a female member, and a pivot pin interconnecting said male and female members; said male members of each stringer being formed at one end of a section and said female members of each stringer being formed at the other end of said section; each section of stringers and rung, together with the male and female members of each section, being pressed from a blank; and locking means for each pivoted section for maintaining the connected sections in the rigid extended position of use.

2. A collapsible ladder according to claim 1 wherein the pivot and locking means are separate members from the male and female members.

References Cited by the Examiner

UNITED STATES PATENTS

| 453,193 | 6/91 | Kinser | 182—163 |
| 646,347 | 3/00 | Betty | 182—24 |
| 2,011,221 | 8/35 | House | 182—24 |
| 2,299,584 | 10/42 | Low | 182—24 |
| 2,792,164 | 5/57 | Cauffield | 182—46 |
| 3,005,513 | 10/61 | Larson | 182—224 |
| 3,103,258 | 9/63 | Scruby | 182—163 |

FOREIGN PATENTS

| 6,223 | 3/01 | Great Britain. |

HARRISON R. MOSELEY, *Primary Examiner.*

UNITED STATES PATENT OFFICE
CERTIFICATE OF CORRECTION

Patent No. 3,216,526                  November 9, 1965

Rudolf Arthur Cole

It is hereby certified that error appears in the above numbered patent requiring correction and that the said Letters Patent should read as corrected below.

Column 1, line 17, for "rungs" read -- rung --; line 54, for "staright" read -- straight --; line 57, strike out "when the sections of the ladder are folded when not in use." and insert instead -- around its respective hinge pin. By mounting the hinges --; same column 1, line 71, for "with the other" read -- within the other --.

Signed and sealed this 6th day of December 1966.

(SEAL)
Attest:

ERNEST W. SWIDER                  EDWARD J. BRENNER
Attesting Officer                     Commissioner of Patents